FREQUENCY SYSTEM

Filed Dec. 4, 1950

INVENTOR.
ROBERT WITTERS
BY Marvin Moody
Atty.

United States Patent Office 2,735,001

Patented Feb. 14, 1956

2,735,001

FREQUENCY SYSTEM

Robert Witters, Cedar Rapids, Iowa, assignor to Collins Radio Company, Cedar Rapids, Iowa, a corporation of Iowa Application December 4, 1950, Serial No. 198,975

3 Claims. (Cl. 250—20)

This invention relates in general to demodulating and anti-frequency drift circuits and in particular to means for obtaining a constant frequency output with a variable frequency input.

It is oftentimes desirable in the transmission of intelligence to use as narrow band width as possible. Because of the limited number of frequencies available and the demands for these frequencies, any scheme which uses them more efficiently is meritorious. For example, in television the picture usually is transmitted as an amplitude modulated wave over a relatively broad band. In addition to the transmission of the picture, it is also necessary to transmit an audio signal. Unless the audio signal is impressed on the picture spectrum, the required band-width for the television transmitter must be widened to allow separate frequencies for the audio.

It is an object of this invention, therefore, to provide means for demodulating an audio signal impressed on a frequency modulated wave.

Another object of this invention is to provide a receiving system wherein a relatively broad band of frequencies may be received and a constant frequency output may be obtained.

Another object of this invention is to provide means for removing amplitude modulation from a frequency and amplitude modulated wave.

Yet another object of this invention is to provide means for obtaining a constant audio tone from a variable continuous wave signal.

A feature of this invention is found in the provision for a broad band receiving means which mixes the incoming signal with a local signal and mixes the output of the first mixer with the incoming signal again to obtain the amplitude modulation on the incoming signal as the output of the second mixer.

Another feature of this invention is to limit the amplitude of an incoming signal and mix the limited signal with the incoming signal to obtain the amplitude modulation on the incoming signal.

Further features, objects, and advantages of this invention will become apparent from the following description and claims when read in view of the drawings in which:

Figure 1:
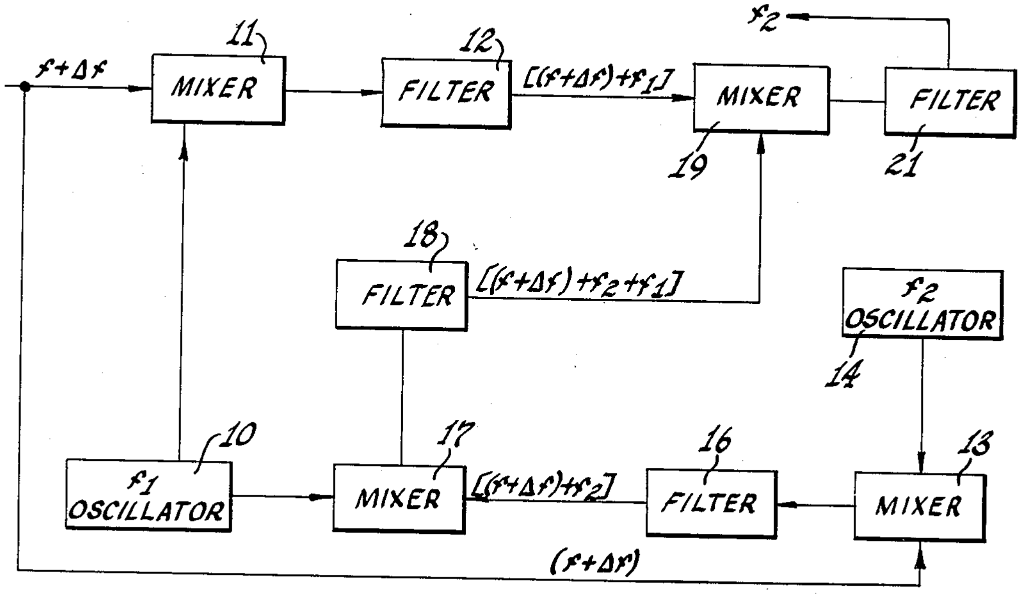
Figure 1 is a schematic drawing of the apparatus of this invention.

Referring to Figure 1, an incoming signal which might be both amplitude and frequency modulated, is designated as $f+\Delta f$ with $\Delta f$ being the frequency deviation caused by modulation of the incoming wave. An oscillator 10, produces an output of $f_1$ which is supplied to a mixer 11 which also receives the incoming wave. A filter 12 receives the output of mixer 11 to pass the sum of the mixed signals which is $f+\Delta f+f_1$. A second mixer 13 also receives the input $f+\Delta f$ and a second signal from an oscillator 14 which produces an output $f_2$. A filter

16 receives the output of mixer 13 and passes the sum of the inputs to obtain $f+\Delta f+f_2$. A third mixer 17 receives the output of filter 16 and an output from oscillator 10. A filter 18 receives the output of the mixer 17 and passes $f+\Delta f+f_2+f_1$. A fourth mixer 19 receives the output of filters 12 and 18 and a filter 21 receives the output of mixer 19. The filter 21 passes only $f_2$.

If the incoming signal $f+\Delta f$ contains amplitude modulation, the modulation will appear in the output of the filter 21 impressed on the frequency $f_2$. However, for this to occur, the signal $f+\Delta f$ must be amplitude limited in its travel through the mixers 13 and 17. Stated differently, if the amplitude of the incoming signal is limited in the mixers 17 or 13, then the $f$ signal fed into mixer 19 from the filter 18 will have a substantially constant amplitude and will beat against the amplitude modulated signal $f$ received from the filter 12 to obtain an audio output which will be impressed on the frequency $f_2$ in the output.

Thus means are provided for separating the amplitude modulation from the frequency modulated wave. The oscillator $f_1$ is used to allow double conversion of the incoming frequency. For example, if the incoming signal is at a high frequency as, for example, 100 megacycles, the oscillator $f_1$ may be used to beat this down to a lower frequency.

Figure 2:
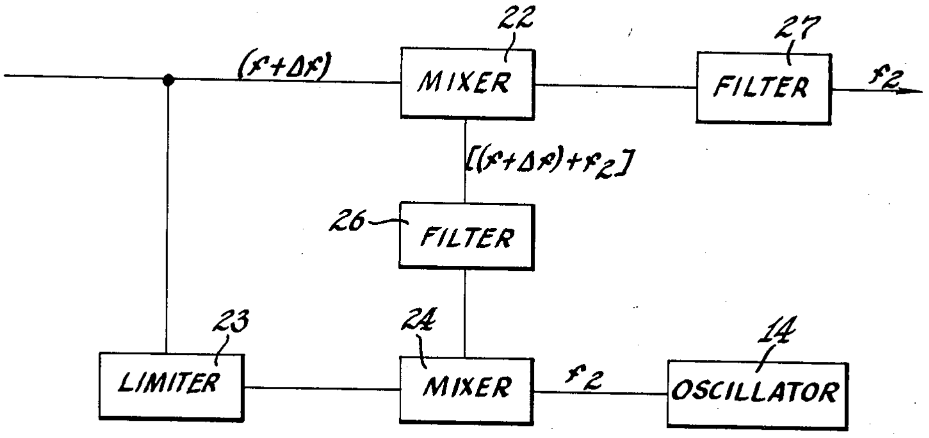
Figure 2 is a schematic drawing on a modification of this invention.

Figure 2 illustrates a modification of the circuit shown in Figure 1 wherein the oscillator 10 is eliminated and the input $f+\Delta f$ is furnished to a mixer 22 and to a limiter 23 which limits the amplitude of the wave. A second mixer 24 receives the output of limiter 23 and an input from oscillator 14, and a filter 26 receives the output of mixer 24 to pass $f+\Delta f+f_2$. The output of filter 26 is furnished to mixer 22 and a filter 27 passes only $f_2$. The amplitude modulation present on the incoming wave will be impressed on the output $f_2$. Thus, if it is desired to listen to an incoming signal whose exact frequency is unknown the apparatus of this invention will intercept the incoming signal and superimpose its amplitude modulation on a constant frequency $f_2$.

Figure 3:
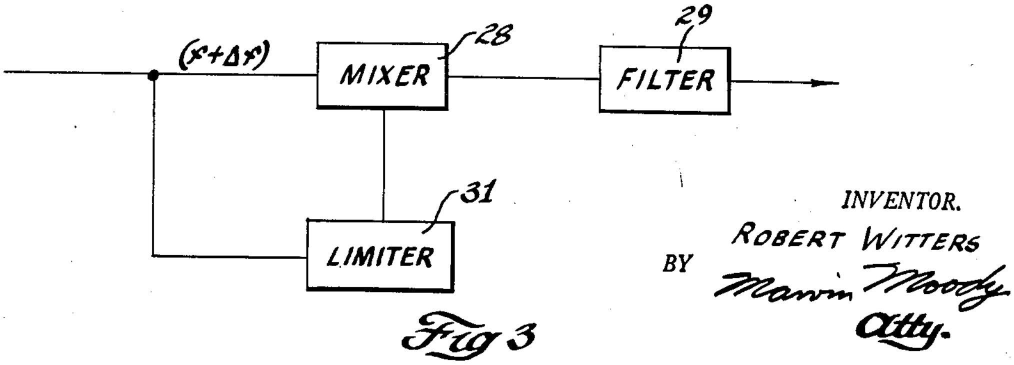
Figure 3 is a further modification of this invention.

Still another modification of this invention is shown in Figure 3 wherein the amplitude modulation on an incoming wave may be removed by furnishing it to a mixer 28 and to a limiter 31 which gives a constant amplitude output. The mixer 28 receives the output of limiter 31 and a filter 29 is connected to the mixer 28. The filter 29 is a low pass filter and passes only the amplitude modulation frequency impressed on the incoming wave.

It is seen that this invention provides means for listening to a broad band of frequencies and for converting an incoming signal to a constant intermediate frequency signal with the amplitude modulation of the incoming signal superimposed on the intermediate frequency signal. It also provides means for removing an amplitude modulation which has been impressed on a frequency modulated signal and thus makes it possible to transfer amplitude and frequency modulation on the same carrier wave.

If the receiver is being used for continuous wave reception the output tone will be impressed on the output of the last mixer in each of the three modifications and there will be no variation in the audio output, as usually occurs with an off-tune signal.

The main features of the present invention are (1) to give a constant audio output with a shifting input carrier, and (2) to provide means for removing the amplitude modulation on an incoming amplitude and frequency modulated wave.

The first object may be understood by considering Figure 1 wherein let it be supposed that an incoming C. W. signal is received. In a conventional superheterodyne receiver, if the carrier frequency drifts, the output attained from the receiver will vary in direct proportion to the amount of drift. This gives an audio output which changes in tone. For example, suppose that at one instance the incoming signal is at one megacycle and that the local oscillators of the receiver beat this down to a 1,040 cycle audio tone. If the input signal drifts to 1.01 megacycles, the audio tone will change to 11,040 cycles per second. The apparatus of Figure 1 eliminates this completely in that the output of the filter 21 is always at $f_2$ which is determined by the local oscillator 14.

To illustrate the second object of the invention, consider Figure 2 and let it be assumed that an incoming carrier signal has impressed thereon both amplitude and frequency modulation. Such signals are well known to those skilled in the art and are oftentimes generated in electronics. It is desired to remove the amplitude modulation from the incoming signal and this is done by passing it through a limiter 23 which limits the amplitude to a fixed value, so that the amplitude excursions are removed. The mixer 22 receives the carrier frequency but it has had the amplitude modulation removed therefrom, by the limiter 23. The F. M. modulation, of course, remains on the wave because a limiter will not remove this type of excursion. When the mixer 22 combines the incoming wave $f$ which contains both frequency and amplitude modulation with the output of the filter 26, one of the frequency components will be the audio modulation. If the filter 27 passes the frequency $f_2$ and rejects higher frequencies, the output will be $f_2$ amplitude modulated by the amplitude modulation present on the incoming wave.

The modification shown in Figure 3 illustrates the manner in which the amplitude modulation may be removed from an incoming amplitude and frequency modulated wave and consists of supplying the incoming wave to a mixer 28 and a limiter 31. Limiter 31 removes the amplitude excursions and supplies its output to the mixer 28. The lowest frequency component from the mixer 28 will be the amplitude modulation from the incoming wave and the low pass filter 29 separates this amplitude modulation which might be, for example, an audio signal from the remaining frequency components.

Although the invention has been described with respect to preferred embodiments thereof, it is not to be so limited as changes and modifications may be made therein which are within the full intended scope of the invention as defined by the appended claims.

I claim:

1. Means for removing amplitude modulation present on an incoming amplitude and frequency modulated signal comprising, a first mixer receiving said incoming signal, a first local oscillator furnishing a signal to said first mixer, a second mixer receiving an input from said first local oscillator, a second local oscillator, a third mixer receiving said incoming signal and an input from said second local oscillator, first filtering means receiving the output of said third mixer, the second mixer receiving an input from the first filter, a second filter receiving the output of the second mixer, and a fourth mixer receiving the output of the second filter and the output of the first mixer.

2. Means for removing amplitude modulation present on an incoming signal and impressing it on a constant signal frequency generated at the receiving station comprising, first, second, third and fourth mixers, a pair of local oscillators, three filters, said first mixer receiving said incoming signal and an output from said first local oscillator, the second mixer receiving an output from said first local oscillator and the first filter, said third mixer receiving the incoming signal and an output from the second local oscillator, said first filter receiving the output of the third mixer, the second filter receiving the output of the second mixer, the third filter receiving the output of the first mixer, and said fourth mixer receiving the outputs of the second and third filters.

3. Circuitry for removing amplitude modulation from an incoming amplitude and frequency modulated signal comprising, a first local oscillator, a first mixer receiving an input from the first local oscillator and the incoming signal, a second local oscillator, a second mixer receiving the output of said second local oscillator and the incoming signal, a first filter receiving the output of the second mixer and passing the highest frequency component, a third mixer receiving inputs from the first filter and the first local oscillator, a second filter receiving the output of the third mixer and passing the highest frequency component, a third filter receiving the output of the first mixer, a fourth mixer receiving inputs from the second and third filters, and a fourth filter receiving the output of the fourth mixer and passing the frequency of the second local oscillator.

References Cited in the file of this patent

UNITED STATES PATENTS

| | | |
|---|---|---|
| 2,024,614 | Terry | Dec. 17, 1935 |
| 2,129,020 | Murphy | Sept. 6, 1938 |
| 2,416,791 | Beverage | Mar. 4, 1947 |
| 2,439,661 | Keever | Apr. 13, 1948 |
| 2,575,047 | Crosby | Nov. 13, 1951 |
| 2,593,266 | Chauveau | Apr. 15, 1952 |
| 2,608,648 | Magnuski | Aug. 26, 1952 |
| 2,623,169 | Gardere | Dec. 23, 1952 |
| 2,664,545 | Leyton | Dec. 29, 1953 |